United States Patent
Hoffmeister (10) Patent No.: US 9,390,708 B1
(45) Date of Patent: Jul. 12, 2016

(54) LOW LATENCY AND MEMORY EFFICIENT KEYWORK SPOTTING

(71) Applicant: Amazon Technologies, Inc., Reno, NV (US)

(72) Inventor: Bjorn Hoffmeister, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 355 days.

(21) Appl. No.: 13/903,814

(22) Filed: May 28, 2013

(51) Int. Cl.
| | | |
|---|---|---|
| G10L 15/00 | (2013.01) | |
| G10L 15/04 | (2013.01) | |
| G10L 15/28 | (2013.01) | |
| G10L 21/00 | (2013.01) | |
| G10L 25/00 | (2013.01) | |
| G10L 21/06 | (2013.01) | |
| G10L 15/14 | (2006.01) | |
| G10L 15/02 | (2006.01) | |

(52) U.S. Cl.
CPC ..................................... *G10L 15/02* (2013.01)

(58) Field of Classification Search
CPC ..... G10L 15/142; G10L 15/30; G10L 15/265; G10L 15/187; G10L 15/22; G10L 15/10; G10L 15/08; G10L 15/02; G10L 15/20; G10L 15/12; G06F 17/289
USPC ......... 704/256, 238, 242, 240, 252, 231, 251, 704/254, 236, 277, 256.5, 270.1, 241, 275, 704/234
See application file for complete search history.

(56) References Cited

U.S. PATENT DOCUMENTS

| | | | | | |
|---|---|---|---|---|---|
| 4,227,177 | A | * | 10/1980 | Moshier | 704/231 |
| 4,241,329 | A | * | 12/1980 | Bahler et al. | 704/231 |
| 4,718,092 | A | * | 1/1988 | Klovstad | G10L 15/193 704/239 |
| 4,829,575 | A | * | 5/1989 | Lloyd | G10L 15/14 704/238 |
| 5,027,406 | A | * | 6/1991 | Roberts | G10L 15/22 704/244 |
| 5,040,127 | A | * | 8/1991 | Gerson | G10L 15/193 704/255 |
| 5,199,077 | A | * | 3/1993 | Wilcox et al. | 704/256 |
| 5,438,630 | A | * | 8/1995 | Chen et al. | 382/159 |
| 5,440,662 | A | * | 8/1995 | Sukkar | 704/236 |
| 5,592,568 | A | * | 1/1997 | Wilcox et al. | 382/218 |
| 5,621,859 | A | * | 4/1997 | Schwartz | G10L 15/142 704/256 |
| 5,675,706 | A | * | 10/1997 | Lee et al. | 704/256 |
| 5,679,001 | A | * | 10/1997 | Russell et al. | 434/185 |
| 5,717,826 | A | * | 2/1998 | Setlur et al. | 704/252 |

(Continued)

*Primary Examiner* — Paras D Shah
*Assistant Examiner* — Anne Thomas-Homescu
(74) *Attorney, Agent, or Firm* — Knobbe, Martens, Olson & Bear, LLP (57) ABSTRACT

Features are disclosed for spotting keywords in utterance audio data without requiring the entire utterance to first be processed. Likelihoods that a portion of the utterance audio data corresponds to the keyword may be compared to likelihoods that the portion corresponds to background audio (e.g., general speech and/or non-speech sounds). The difference in the likelihoods may be determined, and keyword may be triggered when the difference exceeds a threshold, or shortly thereafter. Traceback information and other data may be stored during the process so that a second speech processing pass may be performed. For efficient management of system memory, traceback information may only be stored for those frames that may encompass a keyword; the traceback information for older frames may be overwritten by traceback information for newer frames.

23 Claims, 6 Drawing Sheets

(56) References Cited

U.S. PATENT DOCUMENTS

| | | | |
|---|---|---|---|
| 5,729,656 A * | 3/1998 | Nahamoo | G10L 15/04 704/254 |
| 5,737,489 A * | 4/1998 | Chou et al. | 704/256 |
| 5,797,123 A * | 8/1998 | Chou et al. | 704/256.5 |
| 5,832,430 A * | 11/1998 | Lleida et al. | 704/256 |
| 5,842,163 A * | 11/1998 | Weintraub | 704/240 |
| 5,950,159 A * | 9/1999 | Knill | 704/251 |
| 5,960,395 A * | 9/1999 | Tzirkel-Hancock | G10L 15/12 704/241 |
| 5,983,180 A * | 11/1999 | Robinson | G10L 15/142 704/254 |
| 6,023,676 A * | 2/2000 | Erell | 704/241 |
| 6,073,095 A * | 6/2000 | Dharanipragada et al. | 704/242 |
| 6,138,095 A * | 10/2000 | Gupta et al. | 704/234 |
| 6,236,964 B1 * | 5/2001 | Tamura et al. | G10L 15/10 704/238 |
| 6,260,013 B1 * | 7/2001 | Sejnoha | 704/240 |
| 6,397,179 B2 * | 5/2002 | Crespo et al. | 704/242 |
| 6,539,353 B1 * | 3/2003 | Jiang et al. | 704/254 |
| 6,571,210 B2 * | 5/2003 | Hon et al. | 704/251 |
| 6,594,630 B1 * | 7/2003 | Zlokarnik et al. | 704/256.5 |
| 6,738,745 B1 * | 5/2004 | Navratil et al. | 704/277 |
| 6,829,578 B1 * | 12/2004 | Huang | G10L 15/1807 704/205 |
| 6,850,885 B2 * | 2/2005 | Raddino et al. | 704/236 |
| 7,016,849 B2 * | 3/2006 | Arnold et al. | 704/275 |
| 7,337,116 B2 * | 2/2008 | Charlesworth et al. | 704/254 |
| 7,505,907 B2 * | 3/2009 | Carro | 704/270.1 |
| 7,672,846 B2 * | 3/2010 | Washio et al. | 704/251 |
| 7,908,542 B2 * | 3/2011 | Solomon et al. | 714/774 |
| 7,979,277 B2 * | 7/2011 | Larri et al. | 704/238 |
| 8,275,616 B2 * | 9/2012 | Jung et al. | 704/240 |
| 8,457,959 B2 * | 6/2013 | Kaiser | 704/231 |
| 8,543,399 B2 * | 9/2013 | Jeong et al. | 704/240 |
| 8,694,878 B2 * | 4/2014 | Chowdhury et al. | 714/795 |
| 8,700,399 B2 * | 4/2014 | Vermeulen et al. | 704/242 |
| 8,972,264 B2 * | 3/2015 | Chien | 704/251 |
| 9,015,046 B2 * | 4/2015 | Pereg | G06Q 10/063 379/265.01 |

\* cited by examiner

LOW LATENCY AND MEMORY EFFICIENT KEYWORK SPOTTING

BACKGROUND

Computing devices can be used to process a user's spoken commands, requests, and other utterances into written transcriptions. In a common application, a user can speak into a microphone of a computing device, and an automatic speech recognition module executing on the computing device can process the audio input and determine what the user said. Additional modules executing on the computing device can process the transcription of the utterance to determine what the user meant and/or perform some action based on the utterance.

Automatic speech recognition systems typically include an acoustic model and a language model. The acoustic model is used to generate hypotheses regarding which subword units (e.g., phonemes) correspond to an utterance based on the acoustic features of the utterance. The language model is used to determine which of the hypotheses generated using the acoustic model is the most likely transcription of the utterance based on lexical features of the language in which the utterance is spoken.

Some speech recognition systems are configured to spot particular keywords in a user utterance. Recognition of such keywords can trigger other actions. For example, an automatic speech recognition system may be used to process utterance audio and generate a transcript of the utterance. The system can then determine whether the transcript includes a particular keyword that the system is configured to spot. If the keyword has been positively spotted, another application or process may be initiated.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Speech recognition systems may be used to spot particular keywords in a user utterance in addition to, or instead of, generating transcriptions of full utterances. Spotting keywords can be useful when certain actions are to be triggered in response to a keyword being uttered (e.g., navigating a voice-activated menu system). A standard HMI-based large vocabulary continuous speech recognition ("LVCSR") system that processes utterances to generate transcriptions may be configured to trigger whenever a keyword is part of a recognized word sequence. However, LVSCR decoding is expensive computationally. A common approach is to simplify the LVCSR system by replacing the parts not related to the keyword by a universal background model ("UBM"). The UBM reduces computational load, but also reduces accuracy. A second drawback of the standard approach, independent of using an UBM or not, is latency: only after processing the last feature of an utterance the system can determine whether the keyword was uttered. An end-of-utterance is usually defined as a period of substantial length without speech. This behavior may not be useful in certain real-world applications, where an immediate response to the keyword is required even if it is followed by further speech. For example, assuming silence after the keyword may not be practical in systems that are to be addressed verbally, followed immediately or substantially immediately by a spoken command (e.g., "computer, play music by Frank Sinatra").

Aspects of this disclosure relate to a keyword spotter that is triggered substantially immediately in response to a keyword being spoken, or shortly thereafter, thereby reducing the latency inherent in existing LVCSR systems. In addition, the keyword spotter of the present disclosure does not assume or require silence after the keyword, thereby improving latency over existing UBM-based keyword spotters. The keyword spotter can be configured to assume that each frame of audio input data may be the final frame of a keyword. In some embodiments, the system may determine a probability for each frame regarding whether the frame corresponds to a model of a keyword sound. The system may also determine a probability that the frame corresponds to general speech or non-speech sounds. A keyword likelihood may be continuously updated based on the probability that each frame corresponds to a model of a keyword sound. A background likelihood may also be continuously updated based on the probability that each frame corresponds to a model of general speech or non-speech sounds. When the difference between the keyword likelihood and the background likelihood exceeds a threshold, the system may determine that a keyword has been uttered. The system can then trigger some action, return some data, etc.

Additional aspects of the disclosure relate to the efficient management of traceback information, generated during speech processing, so that a second processing pass may be performed on the frames that the keyword spotter has determined are likely frames of a keyword. By more efficiently handling the memory used to store traceback data, a second speech recognition pass with a larger model (e.g., one that is not limited to only speech, non-speech, and keyword states) may be performed without adding a substantial delay to the overall process. As a result, the system can provide improved keyword recognition accuracy when compared to one-pass keyword spotters. In some embodiments, traceback information may be discarded for frames that are outside a window of time within which a keyword would be spotted. For example, a speech recognition hypothesis that is based on several seconds of data probably does not correspond to a single keyword or phrase, which would typically encompass less than a second of audio data. Discarding traceback information for such frames can reduce the amount of memory required to store traceback data. In addition, the process of pruning dangling back pointers from the traceback data can be eliminated due to the limited amount of data that is maintained.

Aspects of the embodiments described in the disclosure will focus, for the purpose of illustration, on a device configured to both receive spoken input and process the spoken input to spot keywords. However, the systems and techniques described herein may be implemented over a network, such as by a network-accessible speech processing system. In addition, certain features described in the disclosure may be applied to speech processing outside of the keyword spotting context. Various aspects of the disclosure will now be described with regard to certain examples and embodiments, which are intended to illustrate but not limit the disclosure.

Process for Keyword Spotting

Figure 1:
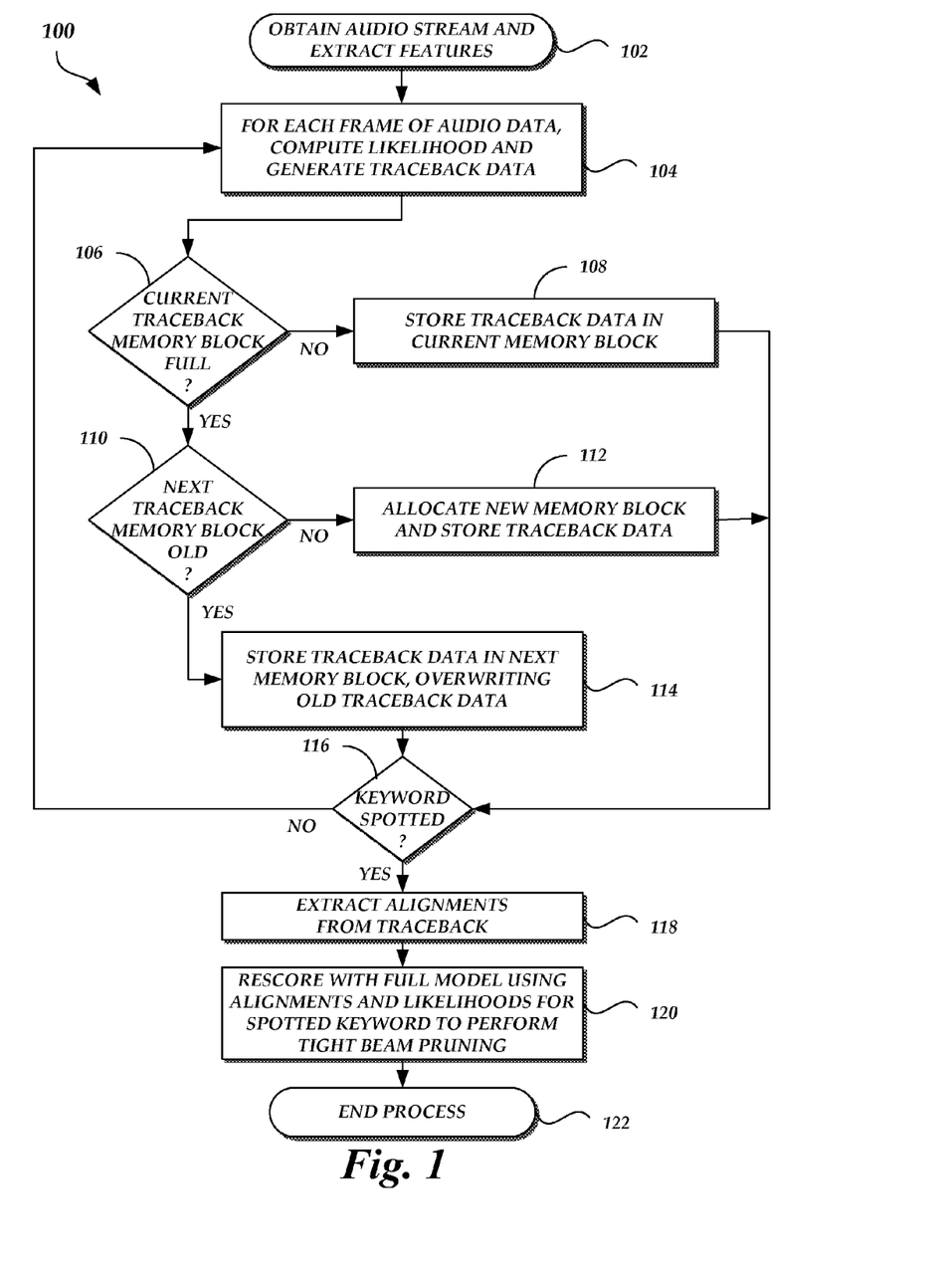
FIG. 1 is a flow diagram of an illustrative process for performing speech recognition processing on an utterance to spot one or more keywords according to one embodiment.

With reference to an illustrative embodiment, FIG. 1 shows a process 100 for spotting keywords in an utterance. Advantageously, the process 100 includes efficient memory management when storing traceback information that may be used for subsequent speech processing passes. Such efficient memory management can facilitate an efficient second speech processing pass, thereby improving keyword recognition accuracy. In addition, the keyword spotting used in the process 100 may provide rapid spotting of keywords within utterances (e.g., silence after the keyword is not required or assumed), thereby allowing other modules, applications, or systems to be triggered by the recognition of a keyword even though an utterance has not yet been fully processed.

In addition to spotting keywords within utterances (or by themselves), the process 100 may be used to spot special keywords, also known as "wake words." For example, a device implementing the process 100 may be configured to identify when a user speaks a wake word that indicates that the user is addressing the device rather than, e.g., other users. The user may use the wake word to address the device and indicate that a spoken command will follow (e.g., in the utterance "phone, play music by Frank Sinatra," the wake word is "phone" and the command is "play music by Frank Sinatra"). In this way, the wake word may be a verbal command indicator. The device need not be controlled via some physical input component (e.g., a keyboard, mouse, etc.), but rather may be activated and controlled through spoken commands without any non-verbal indication that a spoken command is coming. In some embodiments, the device may "listen" to all available audio, and perform some ASR processing and keyword spotting to determine when a keyword, wake word, or other command identifier is spoken. When a user speaks a wake word and issues a spoken command to the device, the device can recognize that the wake word was spoken, and initiate some application or other functionality that is to be triggered by the wake word. One example of a system for wake word identification and processing is disclosed in U.S. patent application Ser. No. 13/711,510, filed on Dec. 11, 2012 and incorporated herein by reference for all that it discloses.

Figure 2:
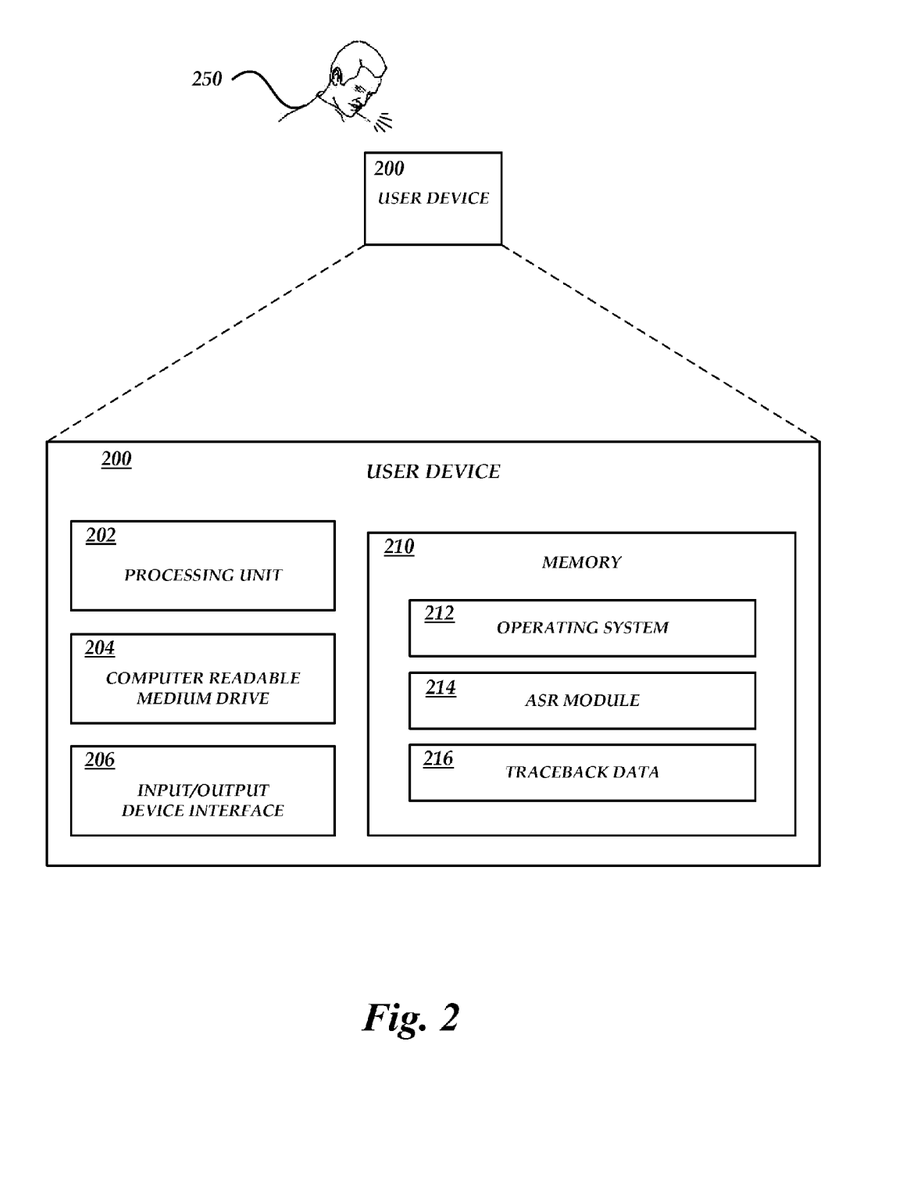
FIG. 2 is a block diagram of an illustrative user device that may implement the process for performing speech recognition processing on user utterances to spot one or more keywords.

FIG. 2 illustrates an example user device 200 that may perform the process 100. The user device 200 may correspond to a wide variety of electronic devices. Illustratively, the user device 200 may be a mobile device, such as a mobile phone, personal digital assistant ("PDA"), mobile gaming device, media player, electronic book reader, tablet computer, laptop computer, or the like. In some embodiments, the user device 200 may be a substantially stationary device, such as a television with program execution capabilities and network connectivity (a "smart TV"), set-top box, gaming console, home entertainment system, desktop computer, server computer, or the like.

In some embodiments, as shown, the user device 200 may be a computing device that includes one or more processing units 202, a computer readable medium drive 204, an input/output device interface 206, and a memory 210. Various data and software modules may be stored in the memory 210 at any time, such as an operating system 212, an ASR module 216, traceback data 216, and the like. The user device 200 shown in FIG. 2 and described herein is illustrative only, and not intended to be limiting. In some embodiments, the user device 200 may include additional, fewer, or alternative modules or components.

With reference to FIG. 1, the process 100 may begin at block 102. The process 100 may be embodied in a set of executable program instructions stored on, e.g., the computer readable medium drive 204 of the user device 200. When the process 100 is initiated, the executable program instructions (e.g., the ASR module 214) can be loaded into memory 210 of the user device 200 and executed by the one or more processing units 202 that are in communication with the memory 210.

The process 100 may be automatically initiated upon receipt of an audio stream, and the user device 200 may begin processing the stream as it is received. The audio stream may be a substantially real-time stream of user utterance audio. In some embodiments, as described above, the client device 200 may "listen" for audio for extended periods of time, or indefinitely until powered off or terminated, etc. Input/output device interface 206 may facilitate the receipt of an utterance from a user 250. For example a microphone may be coupled to, or in communication with, the input/output device interface 206 to accept speech input on which to perform speech recognition and keyword spotting. When a user 250 speaks, audio data of the user's utterance may be passed by the microphone to the input/output device interface 206. The input/output device interface 206 may communicate the audio data to the processing unit 202, or it may have direct access to the memory 210 and can therefore store the audio data in the memory 210 for processing.

The ASR module 214 or some other module or component may extract features from the input audio. Audio input may be partitioned into a sequence of small units of audio, also known as frames. Illustratively, each frame may include 10 ms of audio. A feature vector may be computed or generated based on each frame of audio data, such that a sequence of feature vectors corresponding to the sequence of frames is generated. The feature vectors can include data regarding the acoustic features of the frame and other data associated with the frame.

Figure 3:
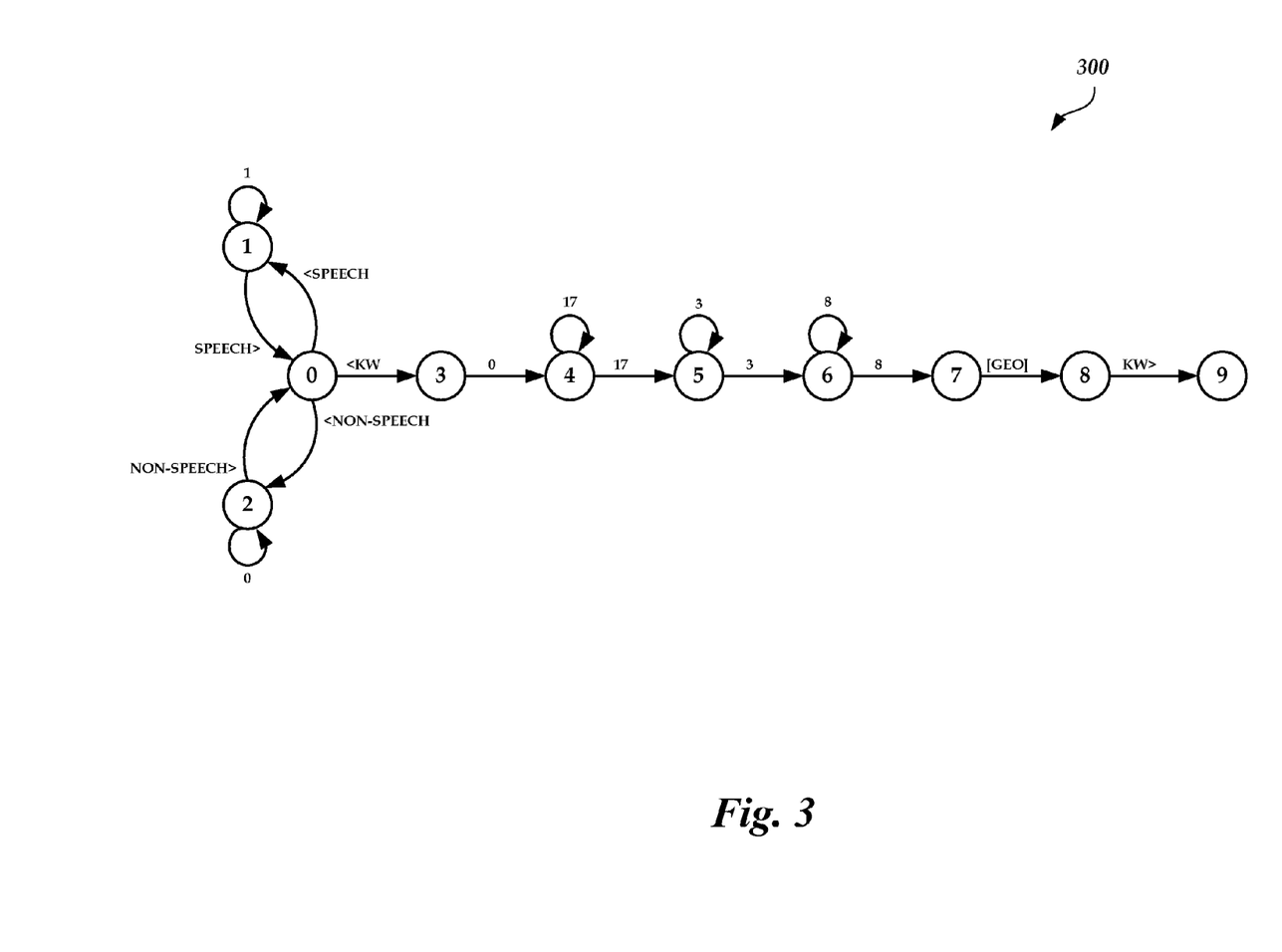
FIG. 3 is a diagram of an illustrative finite state transducer ("FST") for performing keyword recognition according to an embodiment.

At block 104, the ASR module 214 or some other module or component can compute speech recognition scores (e.g., likelihoods or probabilities) for each frame based on a hidden Markov model ("HMM") for the keyword being recognized. In some embodiments, the HMM may be modeled by an FST. FIG. 3 shows an example FST 300 that may be used in the process 100. The FST 300 is a graphical representation of the HMM used in the HMM-based recognition system. Speech recognition decoding with the FST 300 involves aligning feature vectors with the states of the FST 300 (e.g., the numbered circles), and determining or computing a score, such as a likelihood that the frame represented by the feature vector correctly corresponds to a portion of the keyword (e.g., phoneme or other subword unit) associated with each state.

The FST 300 represents an HMM for a particular keyword, in this case "Geo." The process 100 can therefore use this FST 300 to spot instances of the keyword "Geo" in user utterances. The FST 300 is illustrative only, and is not intended to be limiting. The number of individual states in the FST can vary depending upon the particular keyword to be decoded. In some embodiments, the FST may represent an HMM for a phrase of multiple words, rather than a specific keyword. In some embodiments, the FST may represent HMMs for several stand-alone keywords, and may therefore be used to spot multiple different keywords at a time, rather than only one keyword. In some embodiments, the process 100 may use multiple, separate FSTs in parallel to spot different keywords or perform different functions.

The keyword "Geo" has three phonemes, and therefore three states in the FST 300: states 4, 5, and 6. Each of the states has an arc to a subsequent state and also a self looping arc. Each arc is associated with a number that indicates the probability density function ("PDF") for the phoneme that corresponds to the current state. Illustratively, state 4 is the originator of a self-looping arc and an arc pointing to state 5. The number 17 that appears near both of the arcs represents the particular PDF for state 4 (e.g., the Gaussian, of a Gaussian mixture model, for the first phoneme of "Geo"). In a similar manner, state 5 is the originator of arcs associated with the Gaussian mixture model ("GMM") index for the second phoneme of the keyword, and the state 6 is the originator of arcs associated with the GMM index for the third phoneme of the keyword. Note that some arcs in the FST 300 are not associated with a PDF (e.g., they do not have numbers next to them), and therefore do not consume or absorb a frame during processing. The frames may also be known as epsilon arcs. For example, the arc between states 0 and 3 is not associated with a PDF, and therefore a frame of audio data is not consumed in the transition from state 0 to 3. Rather, a label has been added to the arc from state 0 to 3 (e.g., "<kw>"), indicating that this is the beginning of the keyword. Such labels are illustrative only, and are not used to calculate keyword or background likelihoods. The FST 300 illustrated in FIG. 3 requires at least 4 frames of input data, starting at state 0, to reach state 9 where the overall likelihood for the keyword is calculated (e.g., the arcs between states 3-4, 4-5, 5-6, and 6-7 each consume a frame because they are associated with a PDF, while the arcs between states 0-3, 7-8 and 8-9 do not consume any frames because they are not associated with any PDF).

In addition to states for the keyword, the FST 300 has background states for all other speech sounds (state 1) and for all non-speech sounds (state 2). The GMMs that are used in conjunction with the FST 300 may include a subset of the Gaussians of the full acoustic model used the speech processing system. As a result, decoding with the FST 300 may be substantially faster than a full speech recognizer because the size of the FST 300 and the number of computations per feature vector is much smaller. In some embodiments, the speech and non-speech GMMs are derived by merging all speech-related and non-speech-related GMMs into a single speech-related GMM and non-speech-related GMM, followed by a clustering step which reduces the number of Gaussians in the new GMMs. In some embodiments, additional or alternative background models may be used. For example, background models for music, mechanical sounds, and the like may be used instead of, or in addition to, general speech and non-speech models.

As frames of audio data are processed, they may be matched against the PDF for each state (e.g., the first frame may be matched against the PDFs for states 1, 2, and 4; the second frame against states 1, 2, 4, and 5; the third frame against 1, 2, 4, 5, and 6, and so on). Scores (e.g., numbers representing likelihoods or probabilities) can be computed or otherwise determined for each state. Once a sufficient number of frames has been processed to reach the final state of the keyword (e.g., at least 4 frames to reach state 9 from state 0 in the FST 300 illustrated in FIG. 3), a keyword score, such as a score representing the likelihood that the current frame represents the final frame of the keyword, can be determined at state 9. In addition, after each frame, a likelihood score for the speech model (at state 1) and non-speech model (at state 2) can be updated. The higher of the two likelihood scores may be used as the overall likelihood for the background models (at state 0).

The self-looping arcs represent frames that both begin and end in a particular state (e.g., each phoneme of a keyword may encompass multiple frames of audio data, depending upon the phoneme itself, how fast a user is speaking, etc.). The arcs that connect two states represent transition frames (e.g., the last frame associated with a particular phoneme, or the frame that encompasses the transition from one phoneme to the next). The arrows for each arc point in only one direction, and therefore each state may only be arrived at directly from one previous state (the straight arcs) or from itself (the self-looping arcs).

In one example, a user may speak an utterance that includes the word "Jeff" The feature vectors for the first few frames (e.g., 1 or 2 frames), corresponding to the first phoneme of "Jeff," are processed against states 1, 2, and 4 in the FST. Illustratively, a high probability may be calculated for those frames with respect to state 4, which represents the first phoneme of the keyword "Geo," due to the similar or identical initial sounds of the two words. In addition, a moderately high probability may be calculated for those frames with respect to state 1, which represents all speech sounds, while a low probability may be calculated for state 2, which represents non-speech sounds.

For each feature vector that is processed against the FST, a background likelihood (e.g., for state 0 in the FST 300) can be computed or updated to indicate the likelihood that the feature vector corresponds to a background sound or no sound. Once a sufficient number of frames has been processed, a keyword likelihood score (e.g., for state 9 in the FST 300) can be computed or updated to indicate the likelihood that the feature vector corresponds to the last frame of a keyword. A difference between the keyword likelihood at state 9 and the better of the background likelihoods at state 0 (e.g., the better of the likelihoods at states 1 and 2) can be computed, and that difference may form the basis of determining that a keyword has been spotted, as described in detail below with respect to decision block 116.

The feature vectors for the frames that correspond to the second phoneme in the word "Jeff" are also processed against the states in the FST. Illustratively, a relatively low probability may be calculated for those frames with respect to state 5, which represents the second phoneme of the keyword "Geo," due to the different sounds of the second phonemes of each word. A moderately high probability may again be calculated for those frames with respect to state 1, which represents all speech sounds, and a low probability may again be calculated for state 2, which represents non-speech sounds. As the feature vectors for the word "Jeff" continue to be processed, a keyword likelihood at state 9 may be computed (e.g., after 4 or more feature vectors have been processed against the FST 300). As those frames that correspond to the third phoneme of "Jeff" are processed, the keyword likelihood may be low, compared to the background likelihood, due to the low likelihood that feature vectors for frames of the third phoneme in "Jeff" correspond to the third phoneme of "Geo."

While processing the feature vectors against the FST (or afterwards), data regarding likely paths through the FST may be recorded. This data may be referred to as traceback data. Traceback data can indicate a relationship between feature vectors (e.g., between a current feature vector and a prior feature vector in a sequence of feature vectors). Traceback data may include a back pointer indicating a state prior to the current state for the current feature vector, a likelihood score indicating a likelihood that the frame associated with the feature vector corresponds to the current state, and/or other information that may be used to determine alignments. A second processing pass may use the traceback data in order to align frames with their likely corresponding states in the FST. For example, the traceback data can indicate sequences of multiple consecutive frames that most likely correspond to a single phoneme (e.g., how many times a state was arrived at via a self looping arc) and which frames most likely indicate the beginning or ending of a phoneme or a transition between phonemes (e.g., when a state was arrived at from an arc connecting to a prior state).

Figure 4:
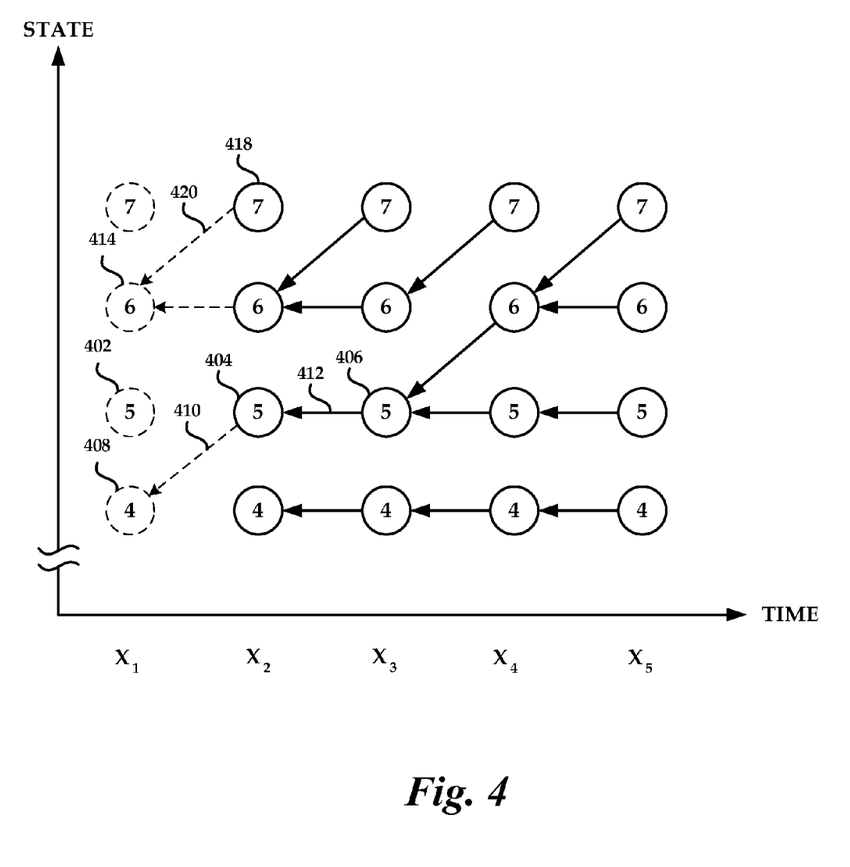
FIG. 4 is a diagram of traceback data for states of a finite state transducer over the course of multiple frames of audio data.

FIG. 4 shows a visual representation of traceback data for several frames of audio data (X1-X5 on the horizontal "time" axis). The nodes represent each state of the FST 300 for each frame of audio data. The back pointer arrows indicate the previous state for a current state of a particular frame of data. Illustratively, node 406 may represent state 5 from the FST 300 for a particular frame X3. As shown in FIG. 2, state 5 may only be arrived at via an arc originating at state 4 or originating at itself, state 5. The back pointer 412 in FIG. 4 indicates that the prior state, at frame X2, was state 5 (e.g., the probability that the prior state was state 5 is higher than the probability that the prior state was 4, and therefore the most likely path to state 5 in frame X3 is a self looping arc rather than an arc from state 4). Node 404 represents state 5 for frame X2, and the back pointer 410 to node 408 indicates that most likely path to state 5 at frame X2 was a transition arc from state 4.

As shown, node 402 is not connected to any node at frame X2 by a back pointer. This means that no state at frame X2 was most likely arrived at via any arc originating from state 5 (e.g., each state for frame X2 was most likely arrived at via an arc originating from other states, rather than from state 5). Node 418 is not connected to any node at frame X3, even though it is connected to node 414 via back pointer 418. In some speech processing systems, dead end nodes and dangling back pointers, such as nodes 418, 414, 402, and back pointer 420, are pruned from the traceback data in order to reduce the total amount of memory that is required to store the traceback data. However, such pruning can be computationally expensive.

Additionally, in some speech processing systems all back pointers are stored for all currently active states. This means that, e.g., the back pointer 410 to node 408 must be maintained because the most recently processed frame (X5) includes states that are connected, via back pointers, to node 408. However, for a keyword spotting system that may run for extended periods of time, this means that some back pointers would need to be maintained indefinitely, even though a keyword is typically encompassed by less than one second of audio data.

Process 100 includes operations for more efficient management of memory than the existing speech processing systems described above. For example, rather than maintaining back pointers indefinitely, the system may use an assumption about the maximum length L of the keyword (e.g., in number of frames or length of time). In some embodiments, the expected maximum length L of the keyword may be based on one or more observations of prior utterances of the keyword. The system may then discard all back pointers older than t−L, where t is the current time frame. As a result, the maximum number of back pointers in the traceback data is S*L, where S is the total number of states in the FST. Typically, S may be a relatively small number (e.g., S<100), such that the total maximum number of back pointers in the traceback data is also relatively small when compared to the traceback data maintained by systems that keep all back pointers for currently active states.

As shown in FIG. 4, the nodes and back pointers drawn with broken lines all relate to data from frame X1. In a system which ignores or discards back pointers that are older than a time t−L, and where L corresponds to 3 frames, then the system may ignore or discard all traceback data from before frame X2. As a result, all nodes and back pointers drawn in broken lines may be ignored, discarded, or overwritten.

In addition, the system may be configured to skip the expensive process of pruning dangling back pointers, because the total amount of traceback data that is maintained is relatively small, even with the dangling back pointers. This has the added benefit of keeping the traceback data in sequential memory spaces, which facilitates efficient processing.

Figure 5:
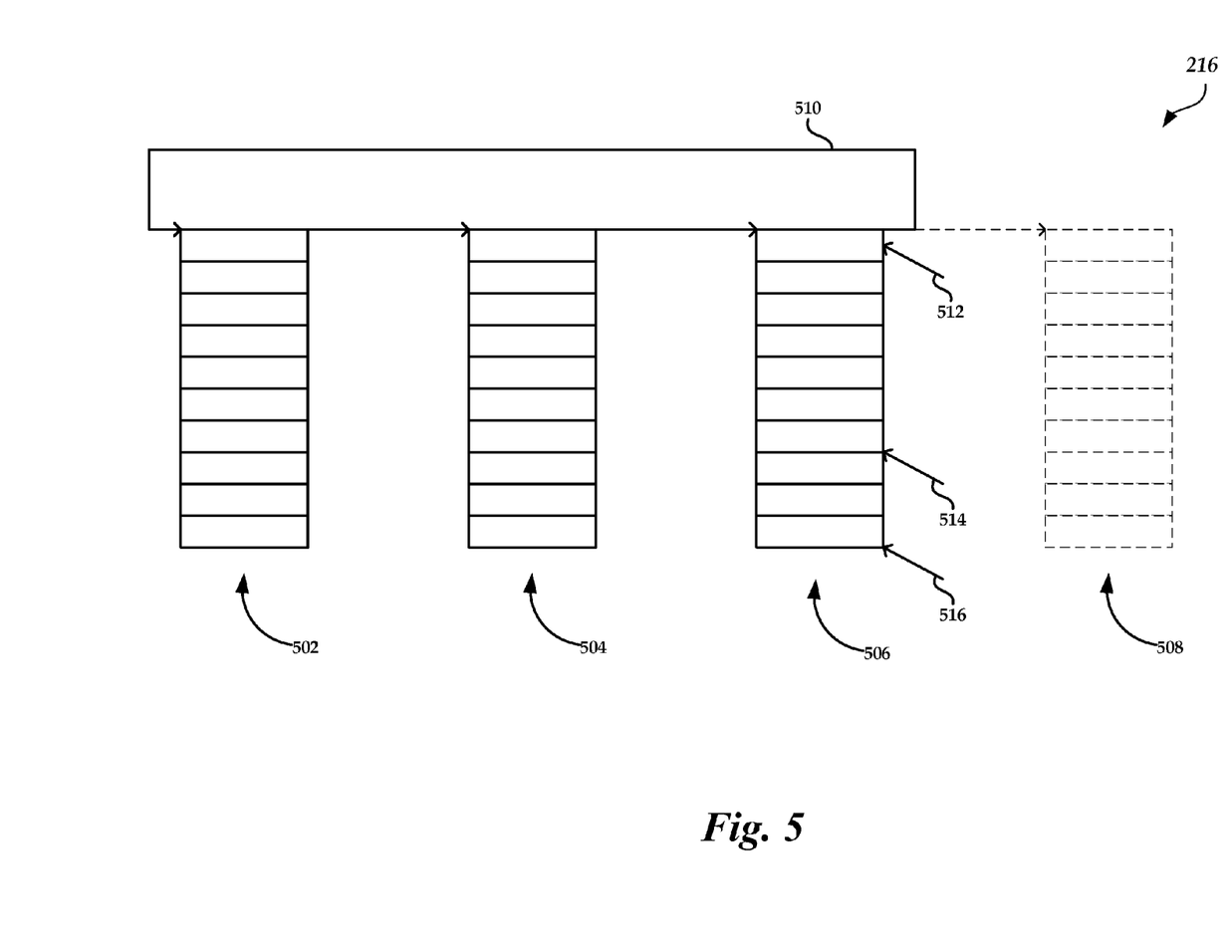
FIG. 5 is a diagram of multiple memory blocks for storing traceback data, illustrating several pointers that may be used in the traceback storage process and the allocation of a new memory block.

FIG. 5 illustrates the traceback data 216 in the memory 210 of the user device 200. In some embodiments, as shown, traceback data 216 may be stored in one or more memory blocks 502, 504, and 506. Each block may be sized to hold a particular number of traceback items (e.g., back pointers or other traceback information). The keyword spotting system may maintain several memory pointers to facilitate use of the memory blocks. For example, the system may use a next pointer 510 which stores an address of the first memory location in the next memory block (block 502 in this example), a memory block pointer 512 which stores an address of the first memory location in the current memory block (block 506 in this example), a current pointer 514 which stores an address of the memory location within the current memory block into which the most recent traceback item was stored, and an end pointer 516 which stores an address of the last memory location within the current memory block. As can be seen in FIG. 5, by not pruning the dangling back pointers from the traceback data 216, the memory locations can remain sequential within a given memory block, which facilitates fast access and processing of traceback data 216 in subsequent speech processing passes (e.g., pointers can be simply incremented and decremented to access the next or previous traceback item because they are stored at the next or previous adjacent memory location, respectively).

With reference to FIG. 1, blocks 106-114 show an example implementation of storing traceback information for the current frame of audio data, as generated in block 104 and described above, in the traceback data 216 portion of the memory 210. At decision block 106, the ASR module 214 or some other module or component can determine whether the current traceback data memory block is full. In some embodiments, the ASR module 214 may do so by incrementing the address in the current pointer 514 and comparing it to the address in the end pointer 516. If they are equivalent, then the current memory block is full, and the process 100 may proceed to block 110. Otherwise, the process may proceed to block 108, where the traceback item for the current frame is stored in the next available memory location (e.g., the memory location at the address in the current pointer 514).

At decision block 110, the ASR module 214 or some other module or component can determine whether the next memory block contains traceback information associated with frames from a time before a threshold time. For example, the ASR module 214 can inspect a field or property associated with the next memory block in the ASR data 216 (e.g., the memory block that begins with the memory location at the address in the next pointer 510). If the data is associated with frames from before the threshold period of time described above (e.g., from before t−L), then the process 100 can proceed to block 114. Otherwise, the process may proceed to block 112.

At block 112, the ASR module 214 or some other module or component may allocate a new memory block (e.g., memory block 508 in FIG. 5) in which to store traceback items. The traceback item for the current frame may be stored at the first memory location of the new memory block, and all pointers may be updated accordingly.

At block 114, the ASR module 214 or some other module or component may overwrite data in an existing memory block because the data is associated with old frames of data (e.g., frames of data that are older than a threshold, as determined in decision block 110). In some embodiments, the ASR module 214 may first delete data in the existing memory block, and then store the new traceback information in the memory block.

Table 1 presents pseudo code for managing the traceback data 216 memory blocks of FIG. 5, as described above.

TABLE 1

```
// memory block; holds SIZE traceback items
struct MemoryBlock
{
  static const int SIZE;
  MemoryBlock *next;
  int maxTime;
  Backpointer *begin, *end;
  Backpointer *current;
  MemoryBlock(MemoryBlock *next=0)
  {
      if (next == 0) { this->next = next; } else { this->next = this; {
        maxTime = 0;
        begin = new Backpointer[SIZE];
        end = begin + SIZE;
        current = begin;
      }
};
// memory location of current memory block
MemoryBlock *memoryBlock = new MemoryBlock;
Backpointer * storeTracebackItem(int time, Backpointer &bptr)
{
  memoryBlock->current += 1;
  // current memory block is full
  if (memoryBlock->current == memoryBlock->end)
  {
      // next memory block cannot be overwritten, allocate new
one
      if memoryBlock->next->maxTime + maxKeywordLength > time
      {
        memoryBlock->next = new MemoryBlock(memoryBlock->next);
      }
      // initialize next memory block
      memoryBlock = memoryBlock->next;
      memoryBlock->current = memoryBlock->begin;
  }
  // store traceback item
  memoryBlock->maxTime = time;
  *memoryBlock->current = bptr;
  // return new memory location of traceback item
  return memoryBlock->current;
}
```

After storing the traceback item for the current frame according to the features described above with respect to blocks 108, 112, or 114, the process 100 may proceed to decision block 116 to determine whether a keyword has been spotted. In some embodiments, the keyword spotting determination of block 116 may be made prior to, or in parallel with, the traceback data storage and memory management process of blocks 106-114.

At decision block 116, the system can determine whether a keyword has been spotted. As described above, the system may determine that the keyword has been spotted if the difference between the keyword likelihood at state 9 of the FST 300 and the background likelihood at state 0 exceeds some threshold, with the keyword likelihood being larger than the background likelihood. If so, the process 100 can proceed to block 120. Otherwise, the process 100 can return to block 104, where the next frame of audio data is processed.

In some embodiments, the system may not immediately trigger for a keyword upon determining that the difference in likelihoods described above exceeds a threshold. Such an approach may not find the precise ending of a keyword, because the difference in likelihoods may exceed the threshold a few frames before the keyword ends. Finding the exact end time is important for post-processing, such as the second speech recognition pass described below for confirming the recognition of the keyword. To ensure that each frame of the keyword has been processed, a timeout may be implemented before the system triggers for the keyword.

In some embodiments, the difference between the keyword likelihood and background likelihood is computed continuously (e.g., for each frame), as described above. If the keyword likelihood is greater than the background likelihood, and if the difference exceeds a threshold and is the largest difference in a time window [t−d, t+d] (where d is some number of frames based on, e.g., a compromise between the amount of latency that is acceptable to users and the amount of time needed to ensure that the end of the keyword has been reached), then the system can trigger for the keyword at time t (e.g., the frame at time t is the last frame of the keyword). By using this approach, the system can trace an increase in the likelihood difference and also tolerate an unsteady, non-smooth increase.

In addition, after triggering for the keyword, the system can impose a timeout before the keyword is subsequently spotted again. For example, the timeout may be set to a period of time that is shorter than the length of the keyword, such as D frames, where T>D>=d, and where T is the approximate length of the keyword. Using these parameters, the keyword cannot end again at time t+D, and therefore the system need not use resources determining whether the keyword is ending during the timeout.

Figure 6:
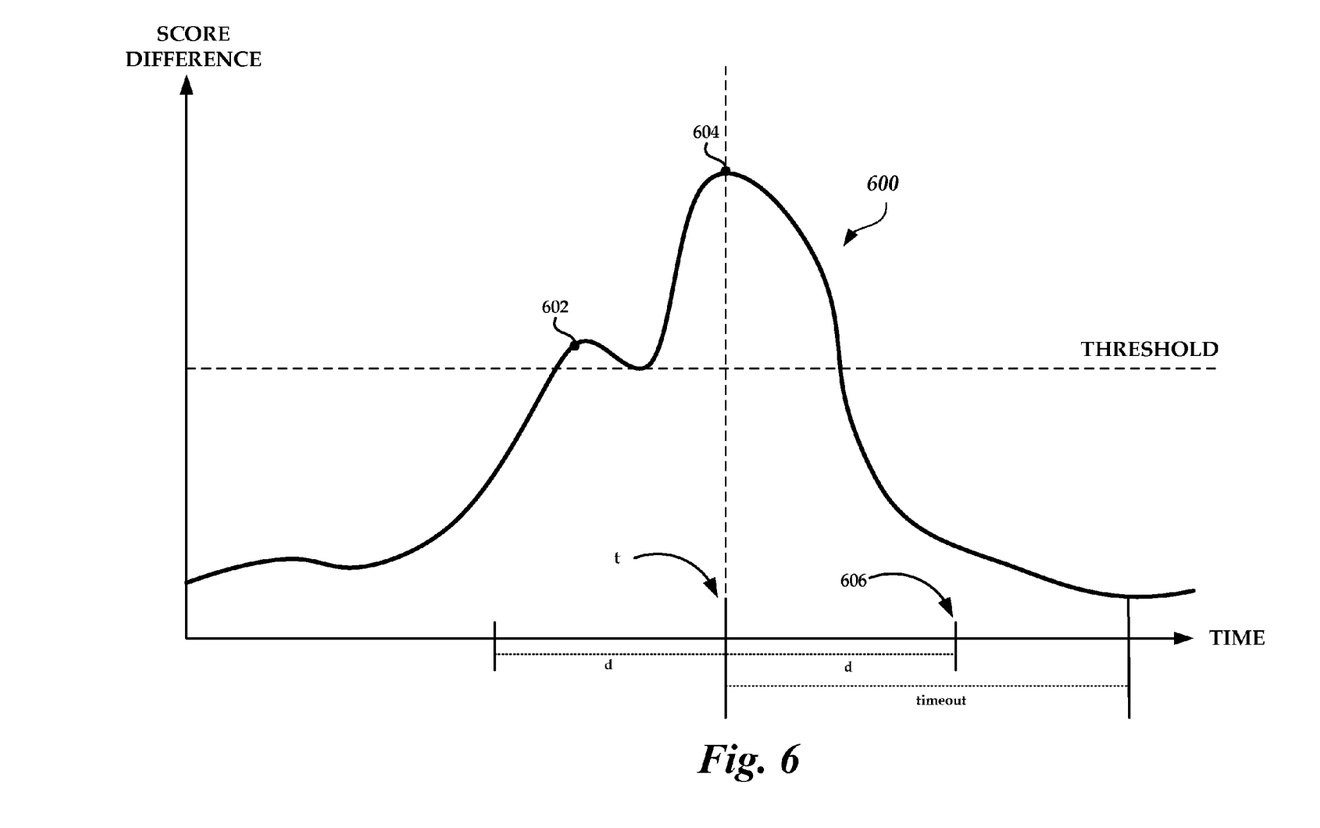
FIG. 6 is a diagram of differences, over time, between the likelihood that particular frames of input data correspond to a keyword and the likelihood that the frames correspond to other speech or non-speech sounds.

FIG. 6 shows an illustrative graph of a likelihood difference over time, as observed during the process 100. As shown, a local maximum 602 may occur while processing an utterance, and the local maximum 602 may exceed the threshold for triggering a keyword. However, the frame corresponding to the local maximum may not be the last frame of the keyword. By waiting to observe a maximum 606 at time t within the window [t−d, t+d], the system can reduce or eliminate the chance of triggering for a keyword before the last frame has been identified. The keyword may be triggered at the end 606 of the window [t−d, t+d]. Table 2 presents pseudo code for tracking the likelihood difference, as described above.

TABLE 2

```
const float scoreDiffThreshold;
const int windowLength;
```

TABLE 2-continued

```
const int timeoutLength;
assert(timeoutLength > windowLength)
float bestScoreDiff = -infinity;
int bestScoreDiffDurtation = 0;
int timeout = 0;
def detectKeyword(scoreDiff):
    if timeout > 0:
        timeout -= 1;
        return false;
    if scoreDiff > bestScoreDiff:
        bestScoreDiff = scoreDiff;
        bestScoreDiffDuration = 0;
    if bestScoreDiff > scoreDiffThreshold:
        bestScoreDiffDuration += 1
        if bestScoreDiffDuration == windowLength:
            bestScoreDiff = -infinity;
            bestScoreDiffDuration = 0;
            timeout = timeoutLength - windowLength
            return true
    return false
```

At block 118, the ASR module 214 or some other module or component may extract alignments from the traceback data stored as described above. In some embodiments, the alignments can be used to optionally rescore the feature vectors that correspond to the spotted keyword, as described below.

At block 120, the ASR module 214 or some other module or component may optionally rescore the feature vectors that correspond to the spotted keyword. The ASR module 214 system may use a full LVCSR model and speech recognition pass to do so, thereby improving the accuracy of the keyword recognition over the fast keyword spotting process described above. In order to reduce the computational overhead and latency introduced by performing a second speech recognition pass with a full LVCSR model, the ASR module 214 may use information generated during the first keyword spotting pass and use a tighter beam for pruning the decoding graph. For example, the ASR module 214 may use the traceback information and keyword likelihoods generated during the first keyword spotting pass. The ASR module 214 may maintain a narrow beam of alternative likely states because it is only confirming that the frames most likely correspond to the keyword. In some embodiments, the ASR module 214 may keep active, for each frame, only those states for which likelihood of the state is within some threshold of the likelihood for the state of the keyword at the same frame.

The system may not determine what word or words the frames most likely correspond to if they do not correspond to the keyword; once it is determined that the keyword is not the most likely transcription, the process 100 can terminate (or return to block 102 or 104 to continue process an utterance or process a subsequent utterance). In addition, because the system may not determine what the correct transcription is, the system may not maintain back pointers during the rescoring process, thereby further improving efficiency.

TERMINOLOGY

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
a computer-readable memory storing executable instructions; and
one or more processors in communication with the computer-readable memory, wherein the one or more processors are programmed by the executable instructions to at least:
obtain a stream of audio data regarding an utterance of a user;
generate a sequence of feature vectors based at least partly on the audio data;
update a keyword score based at least partly on a first score indicating a probability that a particular feature vector of the sequence of feature vectors corresponds to a model for a keyword;
update a background score based at least partly on a second score indicating a probability that the particular feature vector corresponds to a background model;
generate traceback data regarding a relationship between the particular feature vector and a prior feature vector of the sequence of feature vectors;
determine a difference between a time associated with the traceback data and a time associated with previously-stored traceback data;
determine, based on the difference exceeding an expected maximum length of time to utter the keyword, to overwrite the previously-stored traceback data in memory;
overwrite the previously-stored traceback data in memory with the traceback data; and
determine, using the traceback data, that the stream of audio data likely comprises the keyword based at least partly on a difference between the keyword score and the background score.

2. The system of claim 1, wherein the model for the keyword comprises a Gaussian mixture model and a hidden Markov model.

3. The system of claim 1, wherein the one or more processors are further programmed to determine an end of the keyword based at least in part on a largest difference between the keyword score and the background score over a period of time.

4. A computer-implemented method comprising:
generating, by a speech recognition system comprising one or more computing devices configured to execute specific instructions, a sequence of feature vectors based at least partly on audio data, the sequence of feature vectors comprising a first feature vector and a second feature vector;
processing, using a model for a keyword, the first feature vector to determine whether the audio data corresponds to the keyword, wherein the processing comprises generating traceback data regarding at least the first feature vector and the second feature vector;
determining a difference between a time associated with the traceback data and a time associated with previously-stored traceback data;
determining, based at least partly on the difference exceeding an expected maximum length of time to utter the keyword, to overwrite the previously-stored traceback data in memory;
overwriting the previously-stored traceback data in memory with the traceback data; and
determining, using the traceback data, that the audio data likely corresponds to audio of the keyword based at least partly on a difference between a keyword score and a background score.

5. The computer-implemented method of claim 4, wherein the traceback data indicates, for a first state associated with the first feature vector, a second state that preceded the first state.

6. The computer-implemented method of claim 4, further comprising:
generating additional traceback data regarding at least a third feature vector and a fourth feature vector;
determining that a difference, between a time associated with the traceback data and a time associated with the additional traceback data, does not exceed the expected maximum length of time of the keyword; and
allocating a new memory block.

7. The computer-implemented method of claim 6, further comprising storing the additional traceback data in the new memory block.

8. The computer-implemented method of claim 4, wherein the keyword score is based at least partly on a likelihood that the audio data corresponds to a model for the keyword, and wherein the background score is based at least partly on a likelihood that the audio data corresponds to a background model.

9. The computer-implemented method of claim 4, wherein determining that the audio data corresponds to the keyword comprises:
identifying a largest difference between the keyword score and the background score in a window encompassing a plurality of feature vectors; and
determining that the largest difference exceeds a threshold.

10. The computer-implemented method of claim 4, further comprising determining, based at least partly on a second speech recognition pass using the traceback data, whether the audio data corresponds to the keyword.

11. One or more non-transitory computer readable media comprising executable code that, when executed, cause one or more computing devices to perform a process comprising:
generating, by a speech recognition system comprising one or more computing devices configured to execute specific instructions, a sequence of feature vectors based at least partly on audio data, the sequence of feature vectors comprising a first feature vector and a second feature vector;
processing, using a model for a keyword, the first feature vector to determine whether the audio data corresponds to the keyword, wherein the processing comprises generating traceback data regarding at least the first feature vector and the second feature vector;
determining a difference between a time associated with the traceback data and a time associated with previously-stored traceback data;
determining, based at least partly on the difference exceeding an expected maximum length of time to utter the keyword, to overwrite the previously-stored traceback data in memory;
overwriting the previously-stored traceback data in memory with the traceback data; and determining, using the traceback data, that the audio data likely corresponds to audio of the keyword based at least partly on a difference between a keyword score and a background score.

12. The one or more non-transitory computer readable media of claim 11, wherein the traceback data indicates, for a first state associated with the first feature vector, a second state that preceded the first state.

13. The one or more non-transitory computer readable media of claim 11, wherein the process further comprises:
   generating additional traceback data regarding at least a third feature vector and a fourth feature vector;
   determining that a difference, between a time associated with the traceback data and a time associated with the additional traceback data, does not exceed the expected maximum length of time of the keyword; and
   allocating a new memory block.

14. The one or more non-transitory computer readable media of claim 13, wherein the process further comprises storing the additional traceback data in the new memory block.

15. The one or more non-transitory computer readable media of claim 11, wherein the keyword score is based at least partly on a likelihood that the audio data corresponds to a model for the keyword, and wherein the background score is based at least partly on a likelihood that the audio data corresponds to a background model.

16. The one or more non-transitory computer readable media of claim 11, wherein determining that the audio data corresponds to the keyword comprises:
   identifying a largest difference between the keyword score and the background score in a window encompassing a plurality of feature vectors; and
   determining that the largest difference exceeds a threshold.

17. The one or more non-transitory computer readable media of claim 11, wherein the process further comprises determining, based at least partly on a second speech recognition pass using the traceback data, whether the audio data corresponds to the keyword.

18. The system of claim 1, wherein the stream of audio data comprises a sequence of frames of audio data, wherein the particular feature vector comprises information about acoustic features of a particular frame of the sequence of frames of audio data.

19. The system of claim 18, wherein the time associated with the traceback data comprises a first window of time corresponding to a first subset of the sequence of frames, and wherein the time associated with the previously-stored traceback data comprises a second window of time, prior to the first window of time, corresponding to a second subset of the sequence of frames.

20. The computer-implemented method of claim 4, wherein generating traceback data comprises:
   generating a pointer from a current state to a state immediately preceding the current state; and
   generating a likelihood score indicating a likelihood that a portion of audio data associated with the feature vector corresponds to the current state.

21. The computer-implemented method of claim 4, wherein the audio data comprises a sequence of frames of a recording of an utterance, wherein the time associated with the traceback data comprises a first window of time corresponding to a first subset of the sequence of frames, and wherein the time associated with the previously-stored traceback data comprises a second window of time, prior to the first window of time, corresponding to a second subset of the sequence of frames.

22. The one or more non-transitory computer-readable media of claim 11, wherein generating traceback data comprises:
   generating a pointer from a current state to a state immediately preceding the current state; and
   generating a likelihood score indicating a likelihood that a portion of audio data associated with the feature vector corresponds to the current state.

23. The one or more non-transitory computer-readable media of claim 11, wherein the audio data comprises a sequence of frames of a recording of an utterance, wherein the time associated with the traceback data comprises a first window of time corresponding to a first subset of the sequence of frames, and wherein the time associated with the previously-stored traceback data comprises a second window of time, prior to the first window of time, corresponding to a second subset of the sequence of frames.

* * * * *